Feb. 25, 1969 G. RENELT 3,430,037

APPARATUS FOR CHECKING CODE-GROUP TRANSMISSION

Filed April 20, 1965

INVENTOR.
GERHARD RENELT

BY

Frank R. Trifari

AGENT 3,430,037

APPARATUS FOR CHECKING CODE-GROUP TRANSMISSION

Gerhard Renelt, Hamburg, Eidelstedt, Germany, assignor to North American Philips Company Inc., New York, N.Y., a corporation of Delaware Filed Apr. 20, 1965, Ser. No. 449,513
Claims priority, application Germany, June 30, 1964, P 34,602
U.S. Cl. 235—153 1 Claim
Int. Cl. G06f *11/00, 11/04*

ABSTRACT OF THE DISCLOSURE

A system for forming a check symbol of a code group in which each element is added, modulo M, to the result of the previously treated element. Each calculation is multiplied by a factor N either before or after the addition of the given element. (M and N are integers.) The system may comprise a single cyclic modulo M counter to which the code elements are applied in the form of pulses, and to which M pulses are also applied. When the counter passes its zero state, it energizes a switch to apply input pulses to its input also by way of a delay circuit.

Figure 1:
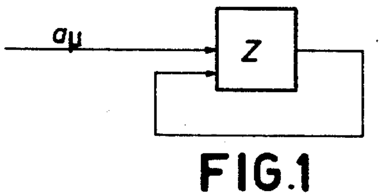

The invention relates to a method and a device for checking the transmission of code groups. A generally known method used for checking incoming code groups with respect to errors in the transmission consists in that each code group comprises a number of additional code elements calculated according to a given law. This law may be chosen so that it becomes possible, at the receiving end, to state whether an incoming code group includes or does not include errors of given types. If the code elements are digits, the additional code element may be, for example, the sum of the digits modulo 10.

In certain cases (for example numbers of account-holders, telephone numbers and so on) the additional code elements may be calculated and added to the code groups. In other cases, however, the additional code elements must be calculated for each code group to be transmitted separately directly prior to its transmission.

At the receiving end the additional code elements may be recalculated and be compared with the received addition code elements. Equality between the received and recalculated additional elements is interpreted as an error-free transmission, although errors of a given type may nevertheless occur. In the event of unequality errors in the transmission are undoubtedly made.

If the code elements are not digits, but, for example, characters or other signs, they may be identified with the digits of a given initial part of the sequence of natural numbers, for example A with 1, B with 2, C with 3 and so on. As a matter of course, also digits, or more generally numbers, may be represented in this way by an initial part of the sequence of natural numbers, in which case, of course, the identical representation is useless. This also applies to the case in which the code elements themselves are groups of bivalent code elements. If there are $n$ different signs, for example A to Z, $n$ numbers are required. Therefore, it is efficient to use a ring of at least $n$ different numbers. The addition and multiplication defined in said ring allows the calculation of the additional code elements (in this case numbers).

Rings having these desired properties are the cyclic counters modulo some integer M, where $M=\geqq n$. In total there are M cyclic counters modulo M, which may be represented by the numbers 0, 1 . . . $M-1$. If $M=10$, the additional code elements are digits. If $M>10$, the code elements may be characters. If the code elements are digits, the preferred values of M are 11 and 13. In general, prime numbers are preferred. The identification of the counters by the additional code elements may be achieved by a given means of a given key.

The most frequent errors in writing are erroneous code elements and interchanges. Errors of the first-mentioned kind can be detected by adding the sum modulo M to the code group as an additional code element. Errors of the second kind cannot be detected by this method. In order to render also these errors detectable different weights $g_1$, $g_2$ . . . may be ascribed to the code element places of the code groups. If $a_1$, $a_2$ . . . are the numbers identified by the code elements, the additional code element P is given by the formula:

$$P=\sum_{\mu=1}^{i} g_\mu \cdot a_\mu \text{ (modulo M)}$$

The weights are often alternately 1 and 2, so that particularly interchanges of adjacent code elements become detectable. However, it is more advantageous to choose the weights as different as possible. With cyclic counters modulo M there are $M-1$ different possible weights, since the weight 0 has no sense. When consecutive weights are different, one can detect not only individual erroneous code elements but also interchanges of code elements spaced from each other by at most $M-1$ code element positions.

Devices are known in which the additional code elements are determined by using position-dependent weights. Each code element position is associated with a given weight. For each code element a cyclic counting circuit is stepped on over a number of steps equal to the product of the number identifying with the code element concerned and the weight of the code element position concerned.

Since the devices concerned must be capable of carrying out multiplications and must, furthermore, comprise various storages, they are technically fairly complicated and have to fulfil high technical requirements. Moreover, the said method has further serious disadvantages. By associating different weights to different code element positions the additional code element must be recalculated when the code elements are shifted over one or more code element positions. When amounts of money are registered from left to right, this involves different additional code elements, if the amounts are written with or without initial zeros. These differences may be compensated by a special indication, it is true, but this involves a fairly considerable additional complication. Particularly, the necessity of indicating the number of code element positions employed leads to further complications.

These difficulties are avoided by determining the check symbol in accordance with the invention, this method consisting in that each of the counters identified with the code elements of the code group are subjected to the following two operations.

Addition of the initial state identified with the code element concerned to the result of the preceding operation or to the state chosen as initial state, if the operation is the first one;

(b) A multiplication of the result of the preceding operation by a fixed state or a multiplication of a state chosen as the initial state by a fixed state, while the operations $a$ and $b$ may be carried out either in the order $a$, $b$ or in the order of $b$, $a$.

The use of the aforesaid method for the determination of the check symbol added to a code group has the advantage that it is easy to achieve, and moreover, that the check symbol is not changed by zeros added in front of the code group. This does not apply to zeros added to the end of the code group.

The aforesaid operations *a* and *b* may be performed, as will be seen from FIG. 1, by means of a cyclic counting circuit Z having M counting stages. The final position of the counter Z indicates the state identified with the check symbol.

The invention will be described with refrence to a few examples. For the code group (35231) a check symbol modulo 11 will be determined. The device operating in accordance with the aforesaid method by simple summation then gives the following successive values:

POSITIONS OF THE COUNTER

| Registered | Initial pos. | Interm. pos. | New position |
|---|---|---|---|
| 3 | 0 | 0+0=0 | 0+3=3 |
| 5 | 3 | 3+3=6 | 6+5=0 |
| 2 | 0 | 0+0=0 | 0+2=2 |
| 3 | 2 | 2+2=4 | 4+3=7 |
| 1 | 7 | 7+7=3 | 3+1=4 |

The last position of the counter is 4. Hence the digit 4, or its complement modulo 11, thereto, i.e., the digit 7, may be used as a check symbol. The desired code group with check symbol is in the last case consequently equal to (352317).

In the given example first the former counter position is doubled and then the incoming digit (or number) is added. This order of succession may, however, be inverted, which will be explained with reference to the example, in which the checking digit of the code group (571906) is calculated.

POSITIONS OF THE COUNTER

| Registered | Initial pos. | Interm. pos. | New position |
|---|---|---|---|
| 5 | 0 | 0+5=5 | 5+5=10 |
| 7 | 10 | 10+7=4 | 4+4=8 |
| 1 | 8 | 8+1=9 | 9+9=5 |
| 9 | 5 | 5+9=1 | 1+1=2 |
| 0 | 2 | 2+0=2 | 2+2=4 |
| 6 | 4 | 4+6=10 | 10+10=7 |

If a character used as a check symbol according to the correspondance A↔1, B↔2, . . . G↔7, . . ., the complete code group with check symbol is: (571906G).

A further example is given by a device in which a multiplication by 3 is employed. The base of the system of the counter is 31. The check symbol is equal to the complement modulo 31 of the last counter position while using the correspondance 0↔0, 1↔1 . . . 9↔9, A↔10 . . . N↔23, P↔24 . . . V↔30. It will now be assessed whether the code group (85190N) contains errors. The calculation of the check symbol is as follows.

POSITIONS OF THE COUNTER

| Registered | Initial pos. | Interm. pos. | New position |
|---|---|---|---|
| 5 | 24 | 24+5=29 | 29+29+29=25 |
| 1 | 25 | 25+1=26 | 26+26+26=16 |
| 9 | 16 | 16+9=25 | 25+25+25=13 |
| 0 | 13 | 13+0=13 | 13+13+13=8 |
| *N | 8 | 8+23=0 | (0+0+0)=0 |

* Check symbol.

At the end of the calculation the counter is at zero, from which it follows that the code group (5190N) does not contain errors.

It should be noted here that the check symbol calculated by the aforesaid method may be made equal to the check symbol found by the known more complicated method by choosing the weights suitably. According to this more complicated method the same check symbol is obtained as in the first example by assigning to the successive code element positions the weights 6, 3, 7, 9, 10. In the second example the weights 12, 6, 3, 8, 4, 2 and in the third example the weights 5, 12, 4, 22, 28 had to be chosen. In general for code groups, with $M-1$ or less signs different weights may be used (in the first example the weights $G_\mu=2^{i-\mu}$ (modulo M), in the second example the weights $G_\mu=2^{i+1-\mu}$ (modulo M) and in the third example the weights $G_\mu=3^{i+1-\mu}$ (modulo M). It appears therefrom that the checking signs calculated in accordance with the invention provide an optimum error detection. Like in the known calculating method, where the weights are to be chosen suitably, the counter in the calculation according to the invention has to perform a multiplication by the most suitable factor (for example by a prime state counter). It is particularly efficient to double the counter positions not only with the counters modulo 11 and 13, but also with the counters modulo 19 and 29. A triplication may be applied advantageously with the counters modulo 10 and 17. Instead of the modulo M counter, a modulo M adder with a storage co-operating herewith may be employed. This storage memorizes the counter position, while in the case of addition one term is derived from the storage, which subsequently stores the result.

Figure 2:
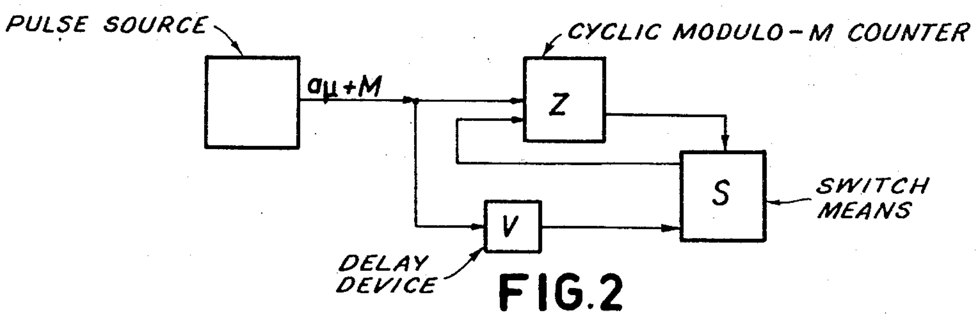
Figure 3:
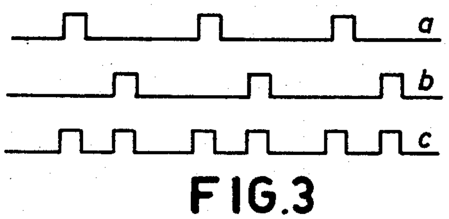

A great advantage of the mtehod according to the invention consists in that it can be technically embodied by simple implementation. The digits added to the various signs may, for example, be represented by pulse sequences supplied by a pulse generator. The adjustment may be obtained for example by depressing a push-button or, in the case of a preliminary stored code group, by interrogating the consecutive code elements of the relevant code group by means of a shift register. In accordance with the invention the check symbols can be supplied by the device which comprises, as is shown in FIG. 2, only one modulo M counter Z (for example a binary counter with feed-back). Prior to or after the summation of a sequence of pulses corresponding to the incoming signal ($a_\mu$) in the counter Z, M pulses are again added thereto. At the zero passage of the counter a switch S is set, which introduces the remaining part of the M—(or $a_\mu+M$) pulses through a delay member V into the counter Z. The delay time is then adjusted so that the delayed pulses *b* enter either between or after or prior to the initial pulses *a* in the counter, which is illustrated in FIG. 3 for the first case. The last of the M pulses moves finally the switch S back into its initial position.

If multiple summation of the counter contents is desired, this is obtained by means of a device in which the switch S switches on a plurality of parallel-connected delay members with different delays. A further, simple possibility of increasing the counter contents consists in that the counter input receives 2M (or in general $k$M) pulses, and when the switch S is switched off only each second (or each $k$th) pulse enters the counter Z. If the modulo M counter consists of a binary counter with feed-back, the increase in counter positions may be obtained by a simple shift of digit position or by an addition on a shifted digit position.

The efficiency of the error detection may be further improved by using a plurality of checking symbols. The device may be equipped with a second, parallel operating modulo M counter, which supplies solely the sum modulo M of the digits. With $M+1$ symbols such a system permits detecting not only all simple errors and errors of interchange, but also all arbitrary double errors (i.e. arbitrary errors on two different positions). When the signs are stored in a storage, it is even possible to form the two check symbols one after the other by means of a device which comprises only one counter.

What is claimed is:

1. A circuit arrangement for calculating check symbols for safeguarding series of information characters, the characters being represented in the form of numbers associated with the information characters, comprising a pulse source for supplying a number of pulses $a_\mu$ corresponding to each information character, a cyclic modulo-M counter, where M is an integer, means connecting the output of said source to said cyclic modulo-M counter, said pulse source being arranged to also supply to said counter a sequence of M-pulses at a predetermined time with respect to the occurrence of said pulses corresponding to an incoming character, switch means, and delay circuit, said counter comprising means for setting said switch means at the zero passing of said counter, said switch means being connected to apply the pulses from said source to said counter by way of said delay circuit whereby the remaining part of the M or $M+a_\mu$ pulses occurring after said zero passing are also applied to the counter by way of said delay circuit, so that said remaining part is counted twice.

References Cited

UNITED STATES PATENTS

| | | | |
|---|---|---|---|
| 2,886,240 | 5/1959 | Linsman | 235—153 |
| 2,911,149 | 11/1959 | Rouche | 235—153 |
| 3,183,482 | 5/1965 | Aberth et al. | 340—146.1 |

FOREIGN PATENTS

| | | |
|---|---|---|
| 852,182 | 10/1960 | Great Britain. |

MALCOLM A. MORRISON, *Primary Examiner.*

CHARLES E. ATKINSON, *Assistant Examiner.*

U.S. Cl. X.R.

235—61.7